United States Patent
Aoyama

(10) Patent No.: US 9,657,456 B2
(45) Date of Patent: May 23, 2017

(54) WHEEL LOADER

(71) Applicant: KOMATSU LTD., Tokyo (JP)

(72) Inventor: Yuichiro Aoyama, Komatsu (JP)

(73) Assignee: KOMATSU LTD., Tokyo (JP)

( * ) Notice: Subject to any disclaimer, the term of this patent is extended or adjusted under 35 U.S.C. 154(b) by 96 days.

(21) Appl. No.: 14/419,021

(22) PCT Filed: Aug. 5, 2014

(86) PCT No.: PCT/JP2014/070593
§ 371 (c)(1),
(2) Date: Feb. 2, 2015

(87) PCT Pub. No.: WO2015/020036
PCT Pub. Date: Feb. 12, 2015

(65) Prior Publication Data
US 2016/0032562 A1 Feb. 4, 2016

(30) Foreign Application Priority Data

Aug. 8, 2013 (JP) .................................. 2013-164759

(51) Int. Cl.
*B60R 3/00* (2006.01)
*E02F 9/08* (2006.01)
(Continued)

(52) U.S. Cl.
CPC ............ *E02F 9/0833* (2013.01); *B60K 13/02* (2013.01); *B60R 3/00* (2013.01); *E02F 9/0866* (2013.01);
(Continued)

(58) Field of Classification Search
CPC .. B60R 3/00; B60R 3/02; E02F 9/0833; E02F 9/0866; F02M 35/02; F02M 35/048; E06C 5/00; E06C 5/02; E06C 5/04
See application file for complete search history.

(56) References Cited

U.S. PATENT DOCUMENTS 2,804,355 A * 8/1957 Bartley ................... E06C 7/165
182/120
2,871,067 A * 1/1959 Brogdon ................... E06C 7/16
182/121
(Continued)

FOREIGN PATENT DOCUMENTS

CN 101356323 A 1/2009
CN 203020205 U 6/2013
(Continued)

OTHER PUBLICATIONS

Caterpillar Brochure for 924K, 930K, 938K Wheel Loaders, copyright 2012.*
(Continued)

*Primary Examiner* — J. Allen Shriver, II
*Assistant Examiner* — Steve Clemmons
(74) *Attorney, Agent, or Firm* — Global IP Counselors, LLP

(57) ABSTRACT

A wheel loader is provided with a cab, a ladder, a vehicle body cover, an engine, an air cleaner, and an expansion member. The ladder has first to third steps. The air cleaner is disposed to the outside of the vehicle body cover and above and to the rear of the ladder. The expansion member is able to assume an expanded posture and a retracted posture. The expansion member abuts at least one step in the expanded posture.

21 Claims, 10 Drawing Sheets

(51) Int. Cl.

| | | |
|---|---|---|
| *E06C 7/16* | (2006.01) | |
| *F02M 35/04* | (2006.01) | |
| *E06C 5/02* | (2006.01) | |
| *B60K 13/02* | (2006.01) | |
| *F02M 35/02* | (2006.01) | |
| *F02M 35/024* | (2006.01) | |

(52) U.S. Cl.
CPC ............... *E06C 5/02* (2013.01); *E06C 7/16* (2013.01); *F02M 35/024* (2013.01); *F02M 35/048* (2013.01); *F02M 35/0201* (2013.01); *F02M 35/02483* (2013.01)

(56) References Cited

U.S. PATENT DOCUMENTS

| | | | | |
|---|---|---|---|---|
| 3,067,836 A * | 12/1962 | Carnicelli | ............... | E06C 7/16 182/121 |
| 3,933,216 A * | 1/1976 | Irwin | ............... | B60K 13/02 180/235 |
| 4,086,975 A * | 5/1978 | Nystuen | ............... | B62D 12/02 180/11 |
| 5,046,582 A * | 9/1991 | Albrecht | ............... | E06C 5/02 182/127 |
| 5,337,857 A * | 8/1994 | Spalt | ............... | E06C 7/165 182/103 |
| 7,563,300 B2 * | 7/2009 | Nishiyama | ............... | B01D 46/0004 55/482 |
| 7,578,371 B2 * | 8/2009 | Allred, III | ............... | E04F 11/064 182/163 |
| 7,654,601 B2 * | 2/2010 | Spellmeyer | ............... | B60N 2/14 296/65.06 |
| 7,905,324 B2 * | 3/2011 | Gil | ............... | B60R 3/02 182/127 |
| 7,967,094 B2 * | 6/2011 | Matsushita | ............... | B62D 25/10 180/69.2 |
| 8,113,315 B2 * | 2/2012 | Farley | ............... | E06C 5/20 182/127 |
| 8,371,077 B2 * | 2/2013 | Delhomme | ............... | E04F 11/04 182/93 |
| 8,657,070 B2 * | 2/2014 | O'Brien | ............... | E06C 7/165 182/120 |
| 2003/0085074 A1 * | 5/2003 | Harmston | ............... | E06C 7/16 182/120 |
| 2007/0131466 A1 | 6/2007 | Gutzwiller et al. | | |
| 2010/0025954 A1 | 2/2010 | Gottlinger et al. | | |
| 2010/0090517 A1 * | 4/2010 | Kramer | ............... | B60R 3/02 299/36.1 |
| 2012/0138379 A1 * | 6/2012 | Tsuji | ............... | E02F 3/7609 180/309 |
| 2012/0267916 A1 * | 10/2012 | Ringer | ............... | F16J 12/00 296/190.11 |
| 2014/0175833 A1 * | 6/2014 | Masuda | ............... | B60R 3/005 296/190.01 |
| 2015/0184360 A1 * | 7/2015 | Aoyama | ............... | F02M 35/164 180/68.3 |

FOREIGN PATENT DOCUMENTS

| | | | | |
|---|---|---|---|---|
| DE | 102007018103 A1 * | 11/2008 | ............... | E06C 1/38 |
| EP | 2 824 244 A1 | 1/2015 | | |
| IT | EP 2388431 A1 * | 11/2011 | ............... | E06C 7/165 |
| JP | 54-161744 U | 11/1979 | | |
| JP | 2000247184 A * | 9/2000 | | |
| JP | 2003-335268 A | 11/2003 | | |
| JP | 2006-341667 A | 12/2006 | | |
| JP | 2007-162358 A | 6/2007 | | |
| JP | 3146866 U | 11/2008 | | |
| JP | 2010084322 A * | 4/2010 | | |
| JP | 2012-184602 A | 9/2012 | | |
| JP | 5325357 B1 | 10/2013 | | |
| JP | WO 2013179755 A1 * | 12/2013 | ............... | E02F 9/0833 |
| JP | WO 2014088033 A1 * | 6/2014 | ............... | B60K 11/04 |

OTHER PUBLICATIONS

The International Search Report for the corresponding international application No. PCT/JP2014/070593, issued on Nov. 18, 2014.
Office Action for the corresponding Chinese patent application No. 201480002054.X, issued on Dec. 28, 2015.
The extended European search report for the corresponding European patent application No. 1483356.4, issued on Dec. 9, 2015.

* cited by examiner

WHEEL LOADER

CROSS-REFERENCE TO RELATED APPLICATIONS

This application is a U.S. National stage application of International Application No. PCT/JP2014/070593, filed on Aug. 5, 2014. This U.S. National stage application claims priority under 35 U.S.C. §119(a) to Japanese Patent Application No. 2013-164759, filed in Japan on Aug. 8, 2013, the entire contents of which are hereby incorporated herein by reference.

BACKGROUND

Field of the Invention

The present invention relates to a wheel loader.

Background Information

An exhaust gas post-treatment device is mounted on a wheel loader. The exhaust gas post-treatment device includes a diesel particulate filter device that collects and removes particulate matter of smoke and the like included in the diesel engine exhaust gas. The diesel particulate filter device is mounted in a row with an air cleaner above the engine. A nitrogen oxide reduction catalyst device may also be provided to remove NOx from the exhaust gas. The nitrogen oxide reduction catalyst device is provided on the exhaust downstream side of the diesel particulate filter device.

As described above, while the diesel particulate filter device is disposed with the air cleaner above the engine, the installation location of the nitrogen oxide reduction catalyst device becomes a problem when the nitrogen oxide reduction catalyst device is installed along with the diesel particulate filter device. Because the nitrogen oxide reduction catalyst device needs to be disposed on the exhaust downstream side of the diesel particulate filter device, generally the nitrogen oxide reduction catalyst device is mounted in a row with the air cleaner and the diesel particulate filter device above the engine when the nitrogen oxide reduction catalyst device is installed along with the diesel particulate filter device.

However, a problem arises with the spatial relationship when the air cleaner, the diesel particulate filter device, and the nitrogen oxide reduction catalyst device are all disposed in a row above the engine. Therefore, although the disposition of a relatively light air cleaner above the diesel particulate filter device and the nitrogen oxide reduction catalyst device may be considered, the top plate of the engine room becomes higher in this case and visibility to the rear is reduced.

Accordingly, a configuration has been proposed for a large-scale dump truck described in Japanese Patent Laid-open No. 2003-335268 in which an engine room is provided beside the cab and an air cleaner is disposed on the outside of the engine room. With such a configuration, visibility to the rear is not reduced when the air cleaner is disposed on the upper portion of the engine room.

However, because the engine room is disposed to the rear of the cab in a wheel loader, visibility to the rear may become reduced if the configuration described in Japanese Patent Laid-open No. 2003-335268 is applied as-is to the wheel loader. Further, the air cleaner needs to be disposed to allow for ease of maintenance work because the filter inside the air cleaner requires regular cleaning and exchanging at certain time periods.

An object of the present invention is to prevent a reduction in visibility to the rear and to enable ease of maintenance work in a wheel loader.

A wheel loader according to a first aspect of the present invention is provided with a cab, a ladder, an expansion member, a vehicle body cover, an engine, and an air cleaner. The cab is provided with a driver seat inside the cab. The ladder is provided at a side of the cab. The ladder has a plurality of steps disposed with intervals therebetween. The expansion member assumes an expanded posture. The expansion member abuts at least one step and protrudes in the vehicle width direction when in the expanded posture. The vehicle body cover is disposed to the rear of the cab and demarcates an engine room. The engine is disposed inside the engine room. The air cleaner includes therein a filter that is exchangeable and cleans air supplied to the engine. The air cleaner is disposed outside of the vehicle body cover. The air cleaner is disposed above and to the rear of the expansion member when the expansion member assumes the expanded posture.

The air cleaner in the wheel loader is provided on the outside of the vehicle body cover and is not provided in the engine room. According to this configuration, because the air cleaner is disposed outside of the engine room, a top plate of the engine room does not need to be made higher even when an exhaust gas post-treatment device is installed above the engine inside the engine room. Therefore, reduction in visibility to the rear can be avoided despite the installation of the exhaust gas post-treatment device.

Moreover, because the air cleaner is disposed above and to the rear of the expansion member while the expansion member assumes the expanded posture, maintenance work on the air cleaner can be performed by the operator while on the ladder and the maintenance work can be performed easily. The expansion member abuts at least one step when the expansion member assumes the expanded posture. As a result, the operator is able to work while standing on the at least one step and the expansion member. In this way, the operator is able to perform the air cleaner maintenance work in a stable posture because the foothold for the operator is widened when working.

The expansion member preferably assumes a retracted posture in which the expansion member is retracted from the at least one step. That is, the expansion member is able to assume the expanded posture and the retracted posture. According to this configuration, when the operator is not performing maintenance work, that is, when the ladder is used for climbing up to and down from the cab, the expansion member does not become an obstruction while climbing up to and down from the cab due to the retracted posture of the expansion member.

The at least one step preferably has a length in the vehicle front-back direction greater than that of the other steps. According to this configuration, the operator is able to perform the maintenance work on the air cleaner while maintaining a stable posture.

The air cleaner is preferably configured so that the filter can be pulled out toward the ladder and disposed to be inclined so that the pulling-out side of the filter is further away from the cab than the opposite side. According to this configuration, the operator is able to remove the filter easily while standing on the at least one step of the ladder.

The wheel loader preferably is further provided with a platform disposed at the side of the cab. The expansion member is positioned under the platform in the retracted posture. According to this configuration, the expansion member does not become an obstruction when the operator uses the ladder for climbing up to and down from the cab due to the expansion member being positioned below the platform.

The expansion member is preferably attached to the platform. According to this configuration, even when the ladder is deformed due to a collision, the expansion member can function effectively because the expansion member is attached to the platform and not to the ladder.

The expansion member preferably has a fixed part, an arm part, and a flat part. The fixed part extends downward from the platform. The arm part couples to the lower end part of the fixed part is a swingable manner. The flat part extends from the arm part in the vehicle front-back direction. The flat part abuts the at least one step in the expanded posture. According to this configuration, the expansion member is able to selectively assume the expanded posture and the retracted posture by swinging the arm part with respect to the fixed part.

The ladder preferably extends downward from the platform disposed at the side of the cab. A first step positioned at the top of the plurality of steps protrudes from the platform in the vehicle width direction. Steps other than the first step protrude in the vehicle width direction from one step above. A protrusion amount of each step is fixed.

According to this configuration, the operator is able to ascend and descend the steps of the ladder smoothly, the expansion member being positioned in the retracted posture.

The ladder preferably has a front strut and a rear strut that extend in the vertical direction and that are disposed away from each other in the vehicle front-back direction. The steps extend to cross between the front strut and the rear strut. The rear strut has an upper part and a lower part. The upper part of the rear strut has attached thereto a first step positioned at the top and a second step positioned second from the top among the plurality of steps. The lower part of the rear strut has another step attached thereto and the lower part is positioned further toward the front than the upper part.

According to this configuration, the first and second steps are attached to the upper part of the rear strut and the upper part of the rear strut is positioned further to the rear than the lower part. As a result, the first and second steps extend further to the rear than the other steps and the operator is able to perform the maintenance work in a position near the air cleaner. In this case, the at least one step corresponds to the first step or the second step.

The rear strut preferably further has a middle part that couples the upper part and the lower part. The middle part is inclined rearward in an upward direction as seen in a side view.

The wheel loader preferably further has a handrail member provided along the rear strut. The handrail member has a vertical part that extends vertically. The vertical part is positioned to the outside of the rear strut in the vehicle width direction. According to this configuration, because the vertical part of the handrail member is positioned to the outside of the rear strut in the vehicle width direction, the operator is able to perform the maintenance work while applying his weight onto the vertical part, and consequently is able to perform the maintenance work of the air cleaner while maintaining a more stable posture.

An upper edge of the handrail member is preferably positioned below the platform disposed at the side of the cab. According to this configuration, the operator will not trip over the handrail member while standing on the platform.

The ladder preferably further has a supplementary step that is below the step positioned at the bottom and that hangs down with elastic strips. According to this configuration, the operator is able to easily climb up to the step positioned at the bottom among the plurality of steps described above, and easily climb down from the step positioned at the bottom to the ground. Because the supplementary step is disposed in a position near the ground, the supplementary step or the elastic strips may collide with an obstruction on the ground. However, the elastic strips for suspending the supplementary step do not undergo plastic deformation.

The cab preferably has a cab body and a door. The rear part of the door is supported by the cab body. The door can be opened and closed toward the front. The air cleaner is disposed at a location that does not obstruct the door when the door is fully open.

According to this configuration, the door is not obstructed by the air cleaner when the driver opens or closes the door to enter or exit the cab.

The wheel loader preferably further includes an operating fluid tank disposed between the cab and the engine. The air cleaner is disposed at the side of the operating fluid tank.

According to this configuration, because the air cleaner is disposed outside of the engine room as described above, a reduction in visibility to the rear is avoided even when the exhaust gas post-treatment device is provided, and the maintenance work on the air cleaner can be performed easily.

The wheel loader is preferably provided with a rear wheel fender disposed above a rear wheel. The air cleaner is fixed to an upper part of the rear wheel fender.

According to this configuration, because the air cleaner is disposed outside of the engine room as described above, a reduction in visibility to the rear is avoided even when the exhaust gas post-treatment device is provided, and the maintenance work on the air cleaner can be performed easily as described above.

According to the present invention, a reduction in visibility to the rear is prevented and the maintenance work on the air cleaner can be performed easily.

DESCRIPTION OF EXEMPLARY EMBODIMENTS

Figure 1:
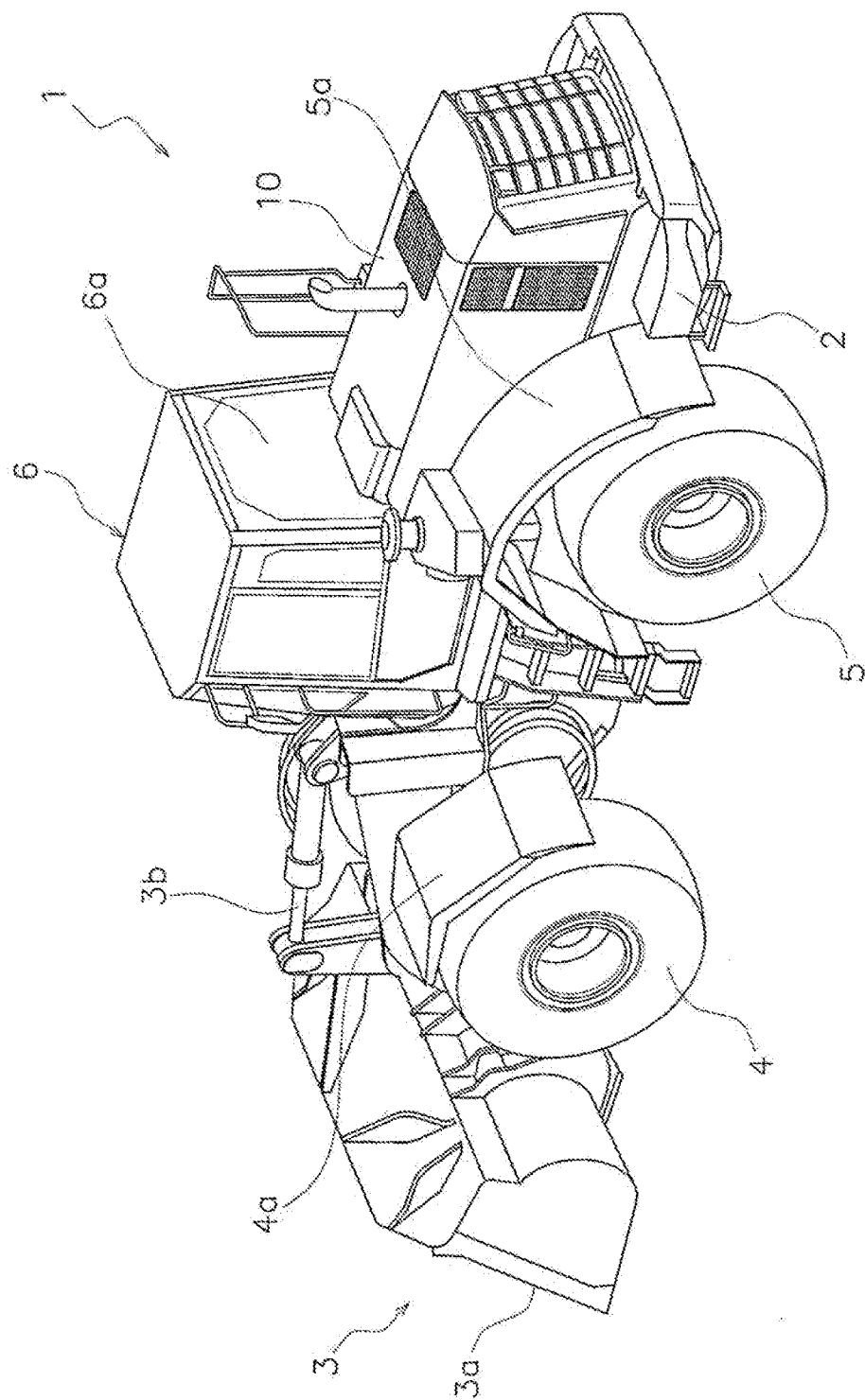
FIG. 1 is an external perspective view of a wheel loader.

An exemplary embodiment of a wheel loader according to the present invention will be explained below with reference to the drawings. FIG. 1 is a perspective view of a wheel loader as seen from the left rear. In the following description, "right," "left," "up," and "down" indicate directions relative to a state of looking forward from the operating cabin, and "vehicle width direction" and "left-right direction" have the same meaning. Further, "width" signifies a length in the left-right direction.

Overall Configuration

A wheel loader 1 includes a vehicle body frame 2, a work implement 3, front wheels 4, rear wheels 5, and a cab 6 as illustrated in FIG. 1. The wheel loader 1 is capable of traveling due to the rotation of the front wheels 4 and the rear wheels 5, and desired work can be conducted using the work implement 3.

The vehicle body frame 2 includes a front body part and a rear body part, and the front body part and the rear body part are connected to each other to allow for swinging in the left-right direction. The work implement 3 and the front wheels 4 are provided on the front body part. The rear wheels 5 and the cab 6 are provided on the rear body part. An operating cabin 6a, various operating members and operating panels are provided inside the cab 6. The work implement 3 is disposed at the front of the front body part and includes a bucket 3a, a bucket cylinder 3b and the like. Fenders 4a, 5a are respectively provided above the front wheels 4 and the rear wheels 5.

Figure 2:
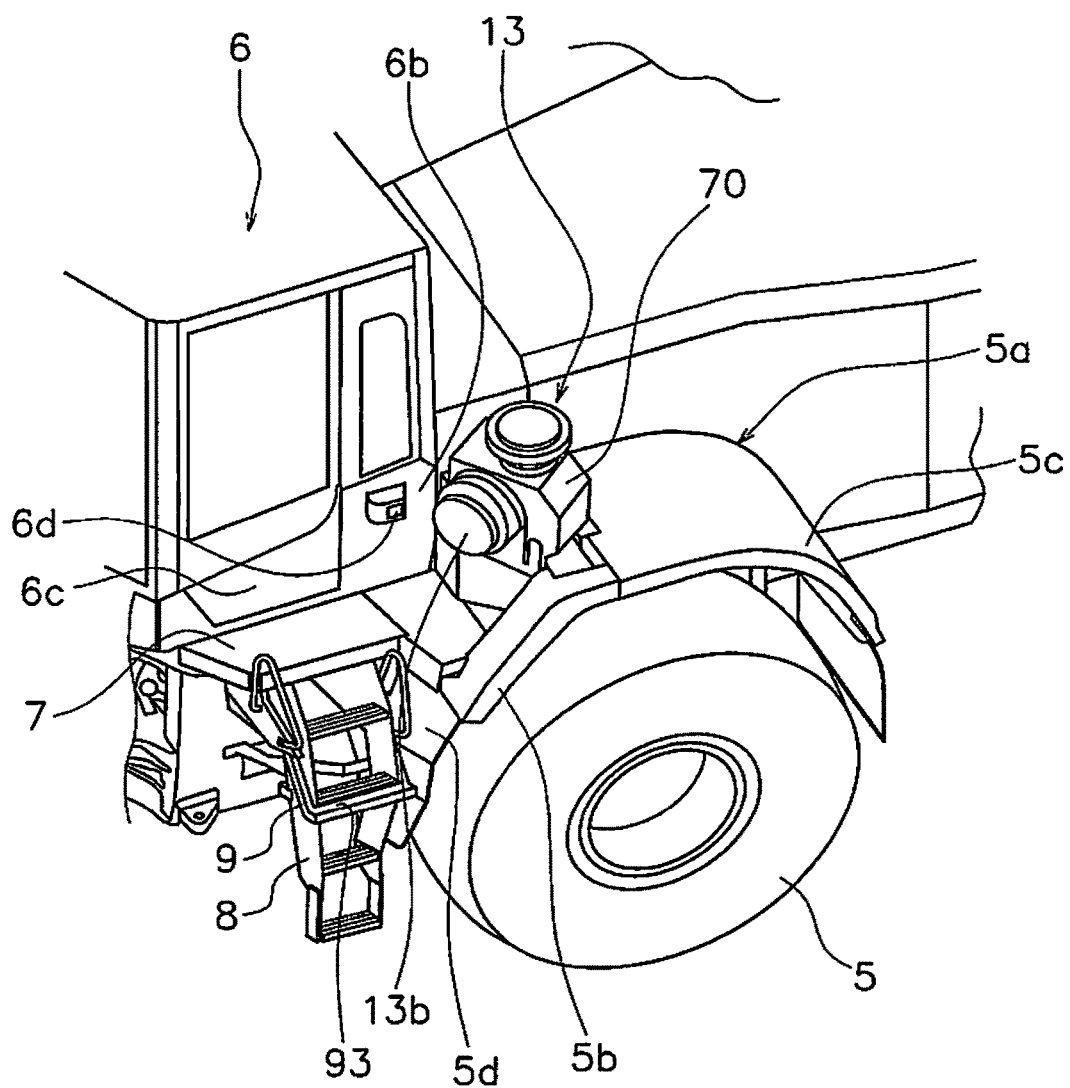
FIG. 2 is an external perspective partial view from the left front of the wheel loader of FIG. 1.

FIG. 2 is a perspective view of an area in the vicinity of the air cleaner as seen from the right front. An expansion member 9 assumes an expanded posture in FIG. 2. As illustrated in FIG. 2, the rear wheel fender 5a has a fender front part 5b and a fender rear part 5c. The fender front part 5b is configured by a horizontal portion and a sloped portion that slopes forward and downward from the horizontal portion. The fender rear part 5c is formed in an arced shape as seen from the side and covers the upper part and the upper rear part of the rear wheel 5. A mud guard 5d extends downward from the front edge of the fender front part 5b to cover the front of the rear wheel 5. More specifically, the mud guard 5d is formed along a rear strut 82b of a ladder 8 to be described below.

The cab 6 has a cab body 6b and a door 6c. The door 6c is supported at a rear edge part by a hinge on the cab body 6b, and a front edge part is able to be opened and closed. The maximum degree of opening of the door 6c is limited by a stopper 6d provided on the outside of the cab body 6b.

A platform 7 is disposed at the left side of the cab 6. More specifically, the platform 7 extends to the left from a lower end part of the cab 6. As a result, the operator can easily climb up and down the ladder 8 because a standing space is secured on the outside of the door 6c. The platform 7 is attached to the vehicle frame 2.

The ladder 8 is provided at the left side of the cab 6 to allow the operator to climb up to and down from the cab 6. More specifically, the ladder 8 extends downward from the platform 7 and is disposed in front of the rear wheel fender 5a.

Figure 3:
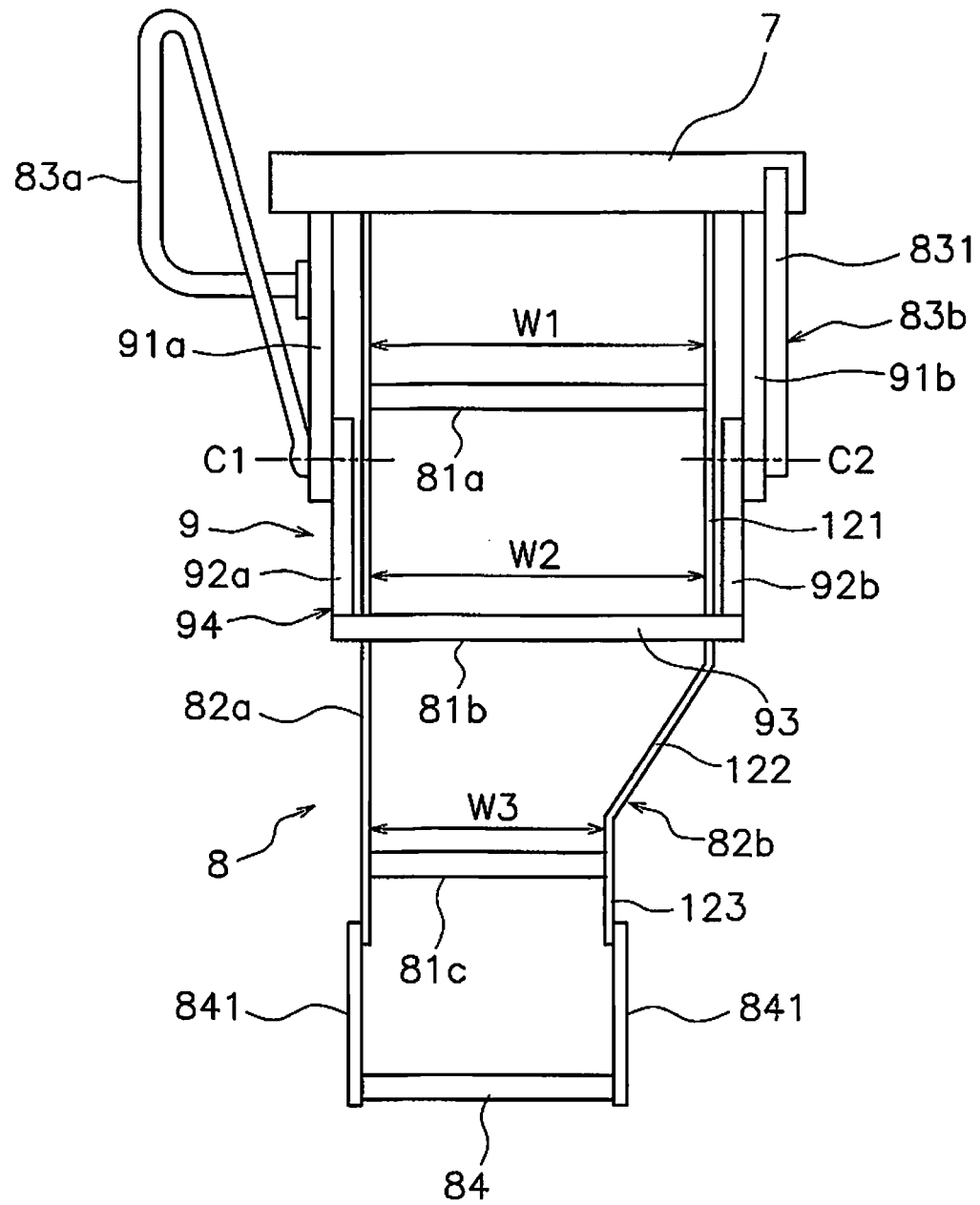
FIG. 3 is a side view of a ladder.
Figure 4:
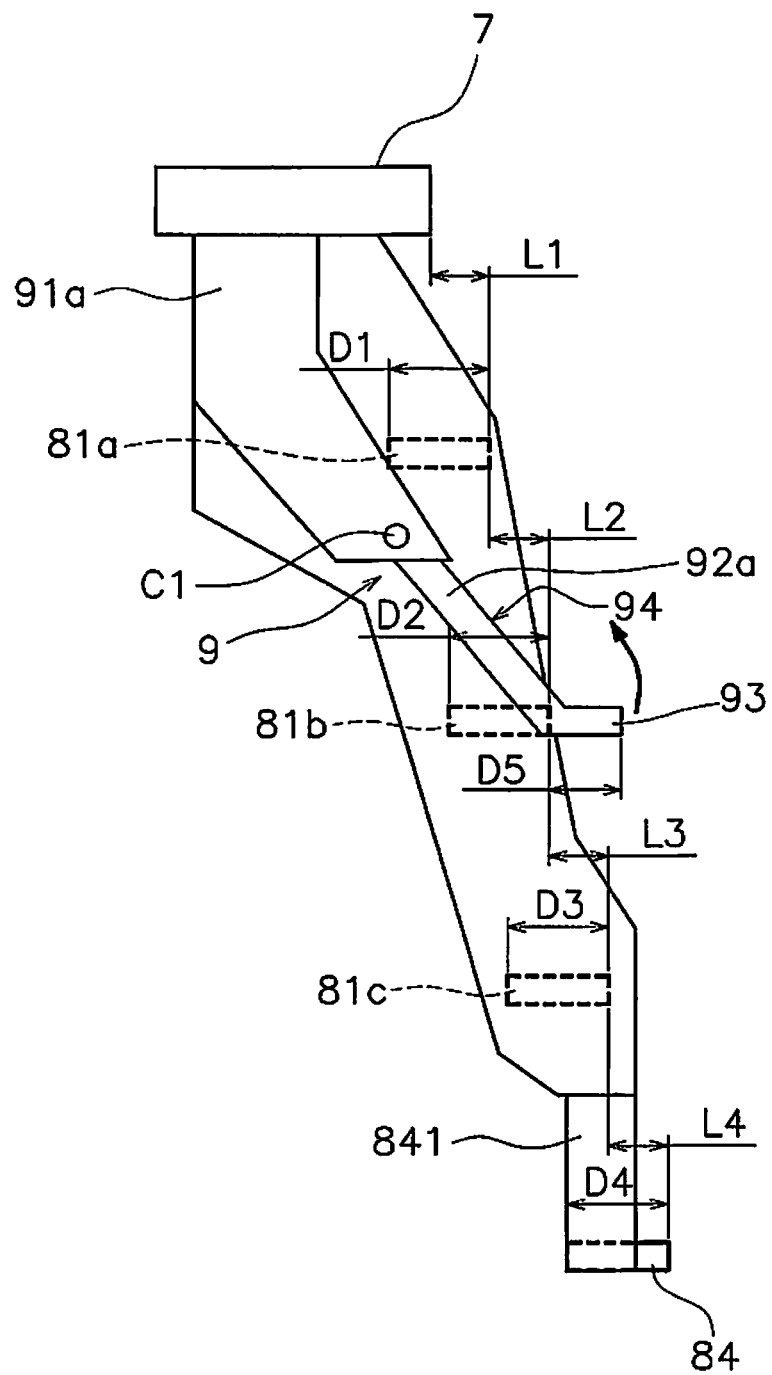
FIG. 4 is a front view of a ladder.

FIG. 3 is a side view illustrating the ladder 8 and the platform 7 as seen from the left side, and FIG. 4 is a front view illustrating the ladder 8 and the platform 7 as seen from the front. The steps are depicted with dashed lines in FIG. 4 so that the positions of the steps can be understood. The expansion member 9 assumes the expanded posture in FIG. 3 and FIG. 4. As illustrated in FIGS. 3 and 4, the ladder 8 has a plurality (e.g., three) of steps 81a to 81c, a front strut 82a, the rear strut 82b, and a supplementary step 84. The three steps 81a to 81c are horizontally disposed with intervals therebetween in the vertical direction, and are disposed from the top in order of the first step 81a, the second step 81b, and the third step 81c. The second step 81b corresponds to the at least one step in the present invention. The steps 81a to 81c are rectangular plates as seen in a plan view and extend in the front-back direction of the vehicle. The first and second steps 81a and 81b are longer in the vehicle front-back direction of the vehicle than the third step 81c. For example, while not limited in particular, respective lengths W1 and W2 of the first and second steps 81a and 81b in the vehicle front-back direction are approximately 430 mm to 480 mm while a length W3 of the third step 81c in the vehicle front-back direction is approximately 300 mm to 350 mm. Moreover, lengths D1 to D3 in the vehicle width direction of the first to third steps 81a to 81c are approximately the same, and while not limited in particular are in the range of 100 mm to 140 mm.

As illustrated in FIG. 4, the steps 81a to 81c protrude in the vehicle width direction. Specifically, the steps 81a to 81c protrude in the direction toward the left (toward the right in FIG. 4). That is, the second step 81b protrudes further to the left than the first step 81a, and the third step 81c protrudes further to the left than the second step 81b. The first step 81a protrudes further to the left than the platform 7. Protrusion amounts L1 to L3 of the respective first to third steps 81a to 81c are approximately the same. The protrusion amount L1 of the first step 81a is the distance in the vehicle width direction between the left edge (right edge in FIG. 4) of the first step 81a and the left edge of the platform 7. The protrusion amount L2 of the second step 81b is the distance in the vehicle width direction between the left edge of the second step 81b and the left edge of the first step 81a. The protrusion amount L3 of the third step 81c is the distance in the vehicle width direction between the left edge of the third step 81c and the left edge of the second step 81b. While not limited in particular, the protrusion amounts L1 to L3 of the first to third steps 81a to 81c are preferably in the range of 50 mm to 65 mm.

As illustrated in FIG. 3, the front strut 82a and the rear strut 82b extend in the vertical direction and are provided with an interval therebetween in the vehicle front-back direction. The first to third steps 81a to 81c extend between the front strut 82a and the rear strut 82b. The front strut 82a is a plate-like member and extends vertically as seen in a side view. The rear strut 82b has an upper part 121, a middle part 122, and a lower part 123 in order from the top. The first step 81a and the second step 81b are fixed to the upper part 121 and the third step 81c is fixed to lower part 123. The upper part 121 extends vertically downward from the platform 7. The middle part 122 extends downward and toward the front from the lower end of the upper part 121. Specifically, the middle part 122 is inclined so that the upper end thereof is positioned further to the rear than the lower end. The lower part 123 extends vertically downward from the lower end of the middle part 122. Specifically, the lower part 123 is positioned further toward the front than the upper part 121. Because the front strut 82a extends vertically downward, the first and second steps 81a and 81c extend further to the rear than the third step 81c.

A pair of elastic strips 841 that extend vertically downward is attached to the lower end parts of the front strut 82a and the rear strut 82b. The supplementary step 84 that extends in the vehicle front-back direction is provided to join the lower end parts of the elastic strips 841 together. The supplementary step 84 is shorter in the vehicle front-back direction than the first step 81a and the second step 81b, and preferably has approximately the same dimensions as the third step 81c as seen in a plan view.

As illustrated in FIG. 4, the supplementary step 84 protrudes further to the left than the third step 81c. A protrusion amount L4 of the supplementary step 84 is approximately the same as the protrusion amounts L1 to L3 of the steps 81a to 81c. The protrusion amount L4 of the supplementary step 84 is the distance in the vehicle width direction between the left edge (right edge in FIG. 4) of the supplementary step 84 and the left edge of the third step 81c.

As illustrated in FIGS. 3 and 4, the expansion member 9 is a member for expanding the distance D2 in the vehicle width direction of the second step 81b of the ladder 8. The expansion member 9 has a front fixed part (example of fixed part) 91a, a rear fixed part (example of fixed part) 91b, a front arm part (example of arm part) 92a, a rear arm part (example of arm part) 92b, and a flat part 93. The front arm part 92a, the rear arm part 92b, and the flat part 93 are formed in an integrated manner.

The front fixed part 91a and the rear fixed part 91b extend downward from the lower surface of the platform 7. The front fixed part 91a extends along the front strut 82a in front of the front strut 82a. An interval is formed between the front fixed part 91a and the front strut 82a. The rear fixed part 91b extends along the rear strut 82b to the rear of the rear strut 82b. An interval is formed between the rear fixed part 91b and the rear strut 82b.

The front arm part 92a is coupled to the lower end part of the front fixed part 91a in a swingable manner around a first swing shaft C1, and the rear arm part 92b is coupled to the lower end part of the rear fixed part 91b in a swingable manner around a second swing shaft C2. The flat part 93 extends between the distal end part of the front arm part 92a and the distal end part of the rear arm part 92b. That is, the flat part 93, which has a rectangular shape as seen in a plan view, extends in the vehicle front-back direction. The front end of the flat part 93 is coupled to the distal end part of the front arm part 92a, and the rear end of the flat part 93 is coupled to the distal end part of the rear arm part 92b. The length of the flat part 93 in the vehicle front-back direction is slightly longer than the length W2 of the second step 81b.

As mentioned above, the front arm part 92a, the rear arm part 92b, and the flat part 93 are formed in an integrated manner. These components are referred to collectively as a body section 94 hereinbelow. The body section 94 is able to swing with respect to the front fixed part 91a and the rear fixed part 91b. The expansion member 9 is able to assume the expanded posture and the retracted posture by swinging the body section 94. Specifically, the expansion member 9 assumes the state illustrated in FIGS. 2, 3 and 4 when in the expanded posture. That is, the expansion member 9 abuts the second step 81b and protrudes in the vehicle width direction when assuming the expanded posture. Specifically, the expansion member 9 is positioned on the left side of the second step 81b so that the flat part 93 abuts the second step 81b.

Figure 5:
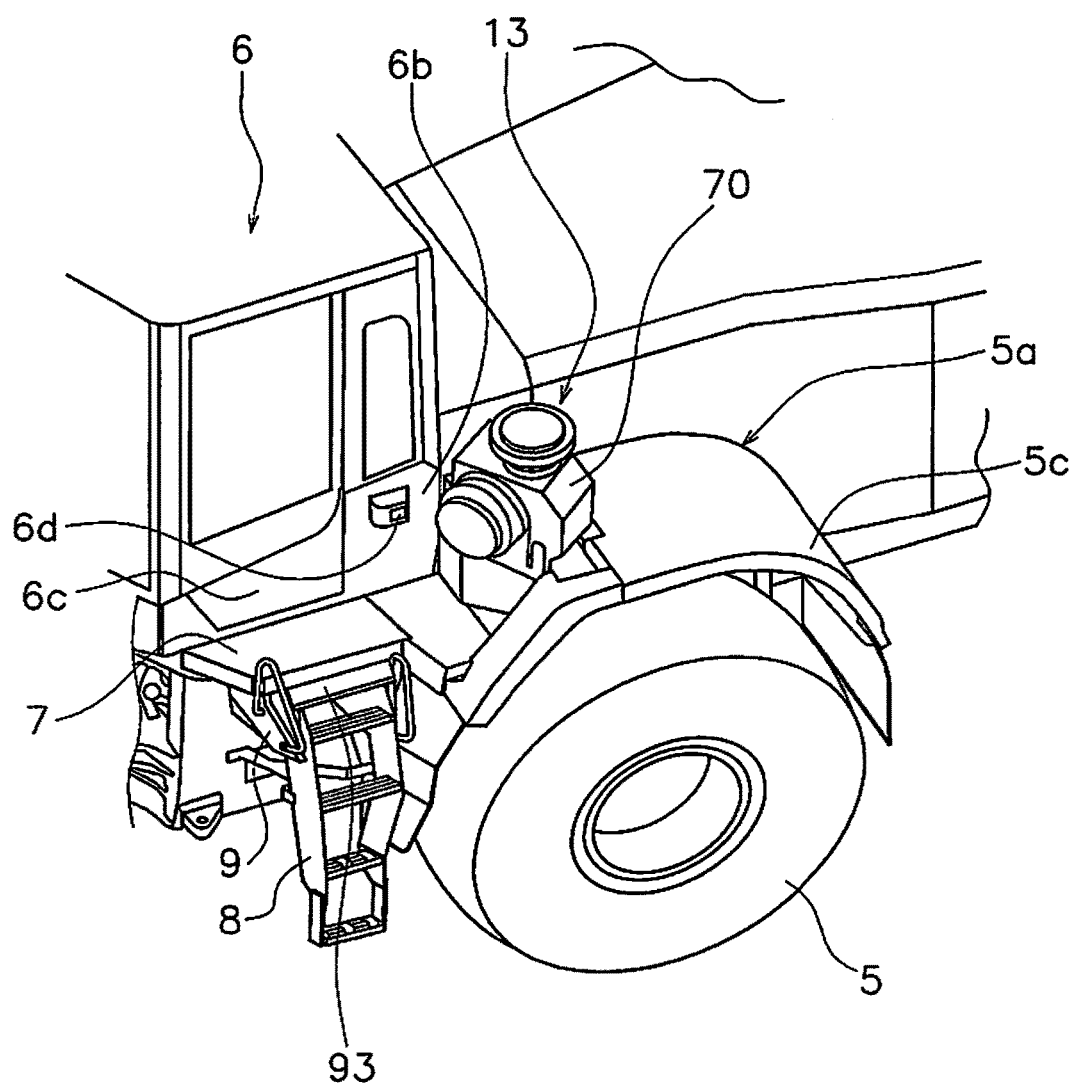
FIG. 5 is an external perspective partial view from the left front of the wheel loader.
Figure 6:
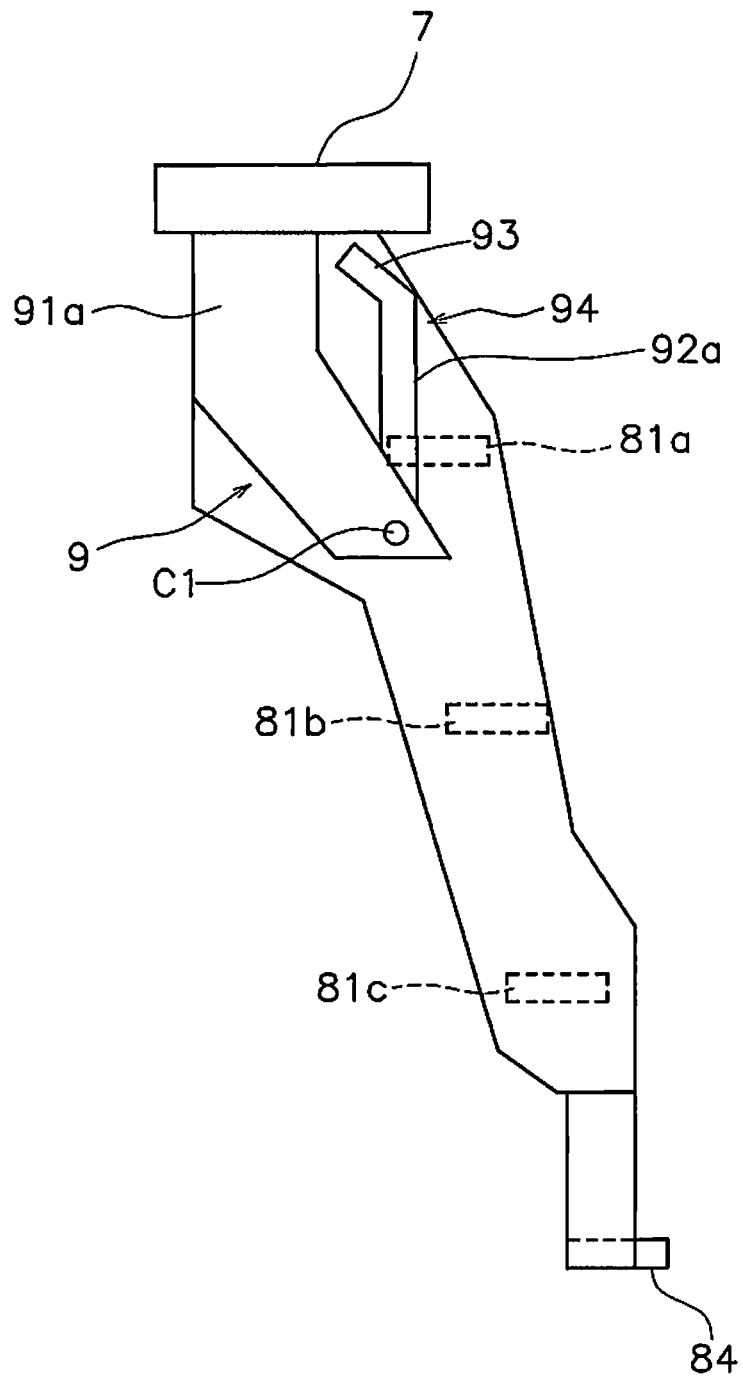
FIG. 6 is a front view of the ladder.

The expansion member 9 assumes the retracted posture illustrated in FIGS. 5 and 6 from the expanded posture illustrated in FIG. 4 by swinging the body section 94 in the anticlockwise direction as indicated by the arrow. As illustrated in FIGS. 5 and 6, the flat part 93 is retracted from the left side of the second step 81b when the expansion member 9 assumes the retracted posture. Specifically, the flat part 93 is positioned below the platform 7 when the expansion member 9 assumes the retracted posture.

As illustrated in FIG. 3, a first handrail member 83a is provided on the front fixed part 91a, and a second handrail member 83b is provided on the rear fixed part 91b. The first and second handrail members 83a and 83b are used by the operator to ascend and descend the ladder 8. The second handrail member 83b has a vertical part 831 that extends vertically. The vertical part 831 is positioned to the left of the rear strut 82b. The upper end of the second handrail member 83b is positioned below the platform 7.

Figure 7:
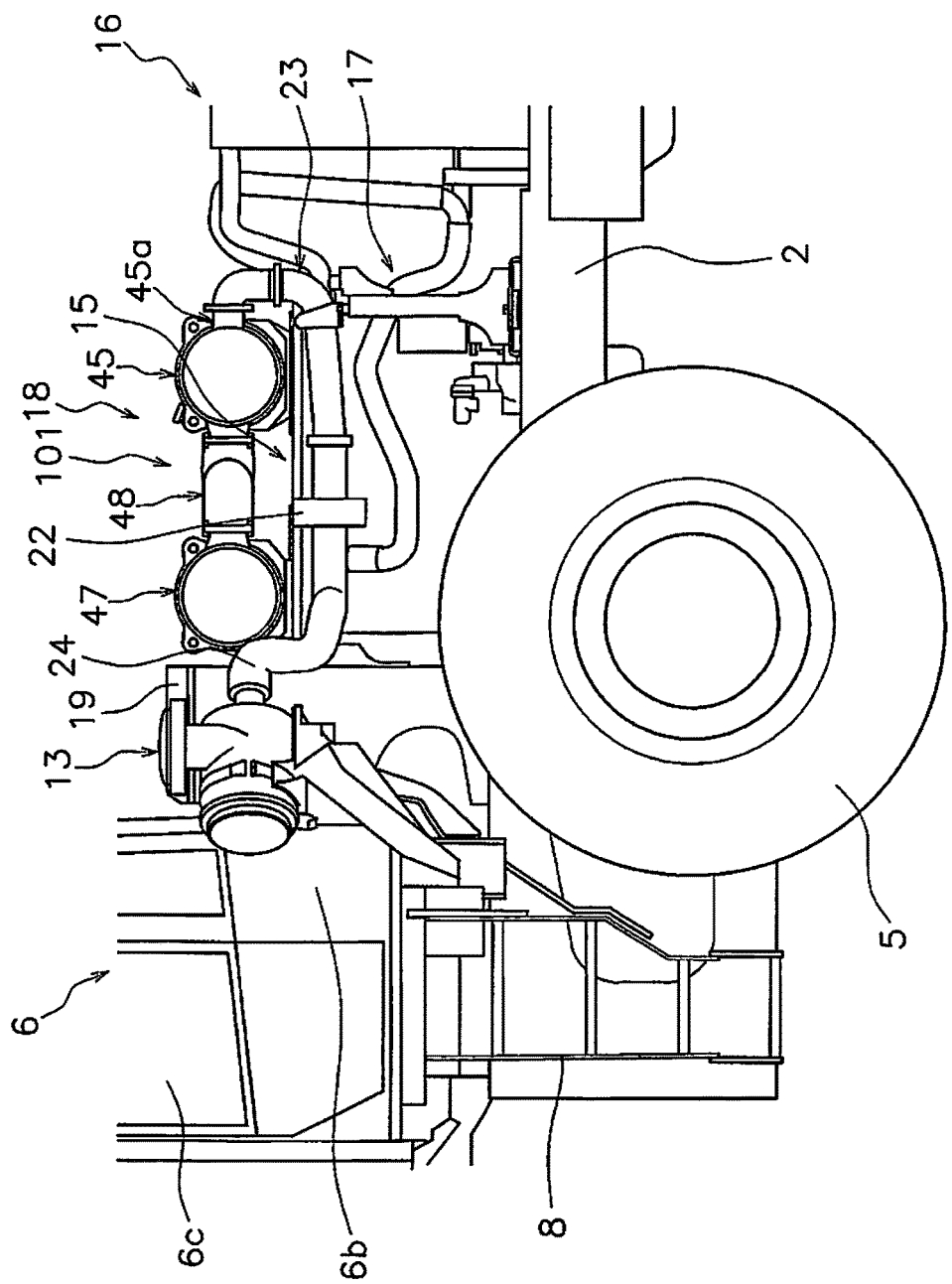
FIG. 7 is a side partial view with the vehicle body cover of the wheel loader removed.

FIG. 7 is a view of the rear body part as seen from the left side of the vehicle with a vehicle body cover 10 (FIG. 1) to the rear of the cab 6 and the rear wheel fender 5a (FIG. 1) removed. The vehicle body cover 10 is a member that demarcates an engine room 101 for housing the engine 15. Specifically, the vehicle body cover 10 covers the engine 15. As illustrated in FIG. 7, the engine 15, a cooling unit 16 disposed to the rear of the engine 15, a supporting mechanism 17, and an exhaust gas post-treatment device 18 mounted on the supporting mechanism 17 above the engine 15 are disposed in a rear part of the rear body part. An operating fluid tank 19 is disposed between the cab 6 and the engine 15.

The engine 15 is a so-called vertical mounted engine and is disposed so that a crankshaft extends in the vehicle front-back direction. The engine 15 is supported on the vehicle frame 2 via a rubber mount.

As illustrated in FIG. 7, a turbo charger 22 that supercharges the air intake due to the exhaust gas is provided on the left side of the engine 15. The turbo charger 22 is provided so that an exhaust gas outlet faces to the rear. A connecting pipe 23 is provided between the turbo charger 22 and the exhaust gas post-treatment device 18. A flexible intake pipe 24 made of plastic is provided between the turbo charger 22 and the air cleaner 13. A difference in vibration between the engine 15 and the air cleaner 13 is absorbed by the intake pipe 24.

Exhaust Gas Post-Treatment Device 18

Figure 8:
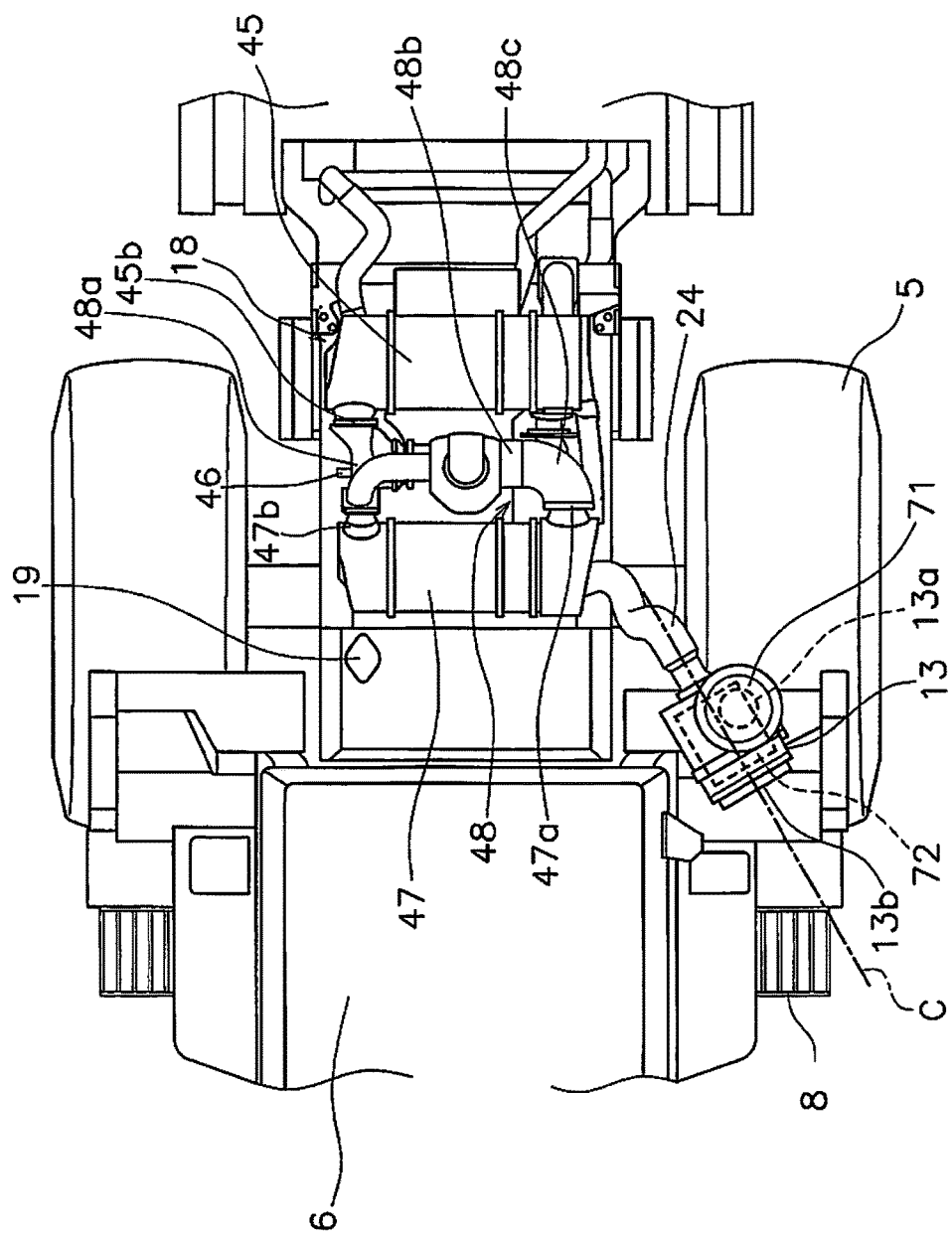
FIG. 8 is a plan view of a disposition of the air cleaner.

As illustrated in FIG. 8, the exhaust gas post-treatment device 18 is equipped with a diesel particulate filter device 45, a connecting pipe 48, and a nitrogen oxide reduction catalyst device 47 in order from the exhaust gas upstream side of the engine 15 (hereinafter referred to simply as "upstream side"). A urea aqueous solution injection device 46 is attached to the connecting pipe 48.

The diesel particulate filter device 45 collects particulate matter, such as smoke and the like, in the exhaust gas, and is mounted on the rear part of a base plate 28 of the supporting mechanism 17. The urea aqueous solution injection device 46 emits a urea aqueous solution sucked up by a pump that is not illustrated from a urea aqueous solution tank that is not illustrated, and adds the urea aqueous solution to the exhaust gas as a reducing agent. The added urea aqueous solution is hydrolyzed to become ammonia, and the ammonia is fed with the exhaust gas through the connecting pipe 48 to the nitrogen oxide reduction catalyst device 47. The ammonia from the urea aqueous solution injection device 46 is used as a reducing agent to purify by reduction the nitrogen oxides in the exhaust gas in the nitrogen oxide reduction catalyst device 47. The nitrogen oxide reduction catalyst device 47 is mounted on the front part of the base plate 28 of the supporting mechanism 17 in the same way as the diesel particulate filter device 45. The diesel particulate filter device 45 and the nitrogen oxide reduction catalyst device 47 are fixed to the base plate 28 with each of the separate attachment plates.

The diesel particulate filter device 45 and the nitrogen oxide reduction catalyst device 47 are disposed parallel to each other. Specifically, the diesel particulate filter device 45 and the nitrogen oxide reduction catalyst device 47 are both cylindrical and the center axes thereof are disposed to extend in the left-right direction and are parallel to each other. An exhaust gas inlet 45a is provided on the left edge part of the diesel particulate filter device 45, and an opening of the exhaust gas inlet 45a faces toward the rear. An exhaust gas outlet 45b is provided on the right edge part of the diesel particulate filter device 45, and an opening of the exhaust gas outlet 45b faces toward the front. An exhaust gas inlet 47a is provided on the left edge part of the nitrogen oxide reduction catalyst device 47, and an opening of the exhaust gas inlet 47a faces toward the rear. An exhaust gas outlet 47b is provided on the right edge part of the nitrogen oxide reduction catalyst device 47, and an opening of the exhaust gas outlet 47b faces toward the rear and obliquely upward. The connecting pipe 48 is disposed between the exhaust gas outlet 45b of the diesel particulate filter device 45 and the exhaust gas inlet 47a of the nitrogen oxide reduction catalyst device 47.

As illustrated in FIG. 8, the connecting pipe 48 has a first bend section 48a, a linear section 48b, and a second bend section 48c, and the entire connecting pipe 48 forms an S shape. The first bend section 48a is located near the exhaust gas outlet 45b of the diesel particulate filter device 45, and the second bend section 48c is located near the exhaust gas inlet 47a of the nitrogen oxide reduction catalyst device 47. The linear section 48b is located between the first bend section 48a and the second bend section 48c and is disposed parallel to the diesel particulate filter device 45 and the nitrogen oxide reduction catalyst device 47.

The urea aqueous solution injection device 46 is provided on the first bend section 48a and emits a urea aqueous solution into the connecting pipe 48. The emitted urea aqueous solution becomes evenly mixed with the exhaust gas while passing through the long linear section 48b.

Air Cleaner 13

The air cleaner 13 and a disposition thereof are explained with reference to FIGS. 2 and 9. The air cleaner 13 is disposed outside of the engine room, that is, to the outside of the vehicle body cover 10. The air cleaner 13 is disposed above and to the rear of the expansion member 9 when the expansion member assumes the expanded posture. The air cleaner 13 is disposed in a position to allow the operator to reach the air cleaner 13 with his hands while standing on the second step 81b of the ladder 8. Specifically, the air cleaner 13 is provided on the upper part of the rear wheel fender 5a. Specifically, the air cleaner 13 is mounted on the horizontal portion of the fender front part 5b.

As illustrated in FIG. 2, except for a portion thereof, the air cleaner 13 is covered by an air cleaner cover 70 that is provided on the outside of the vehicle body cover 10. FIG. 9 is a plan view of the air cleaner 13 and a portion that pertains to the air cleaner 13 with the vehicle body cover 10 and the air cleaner cover 70 removed.

Figure 9:
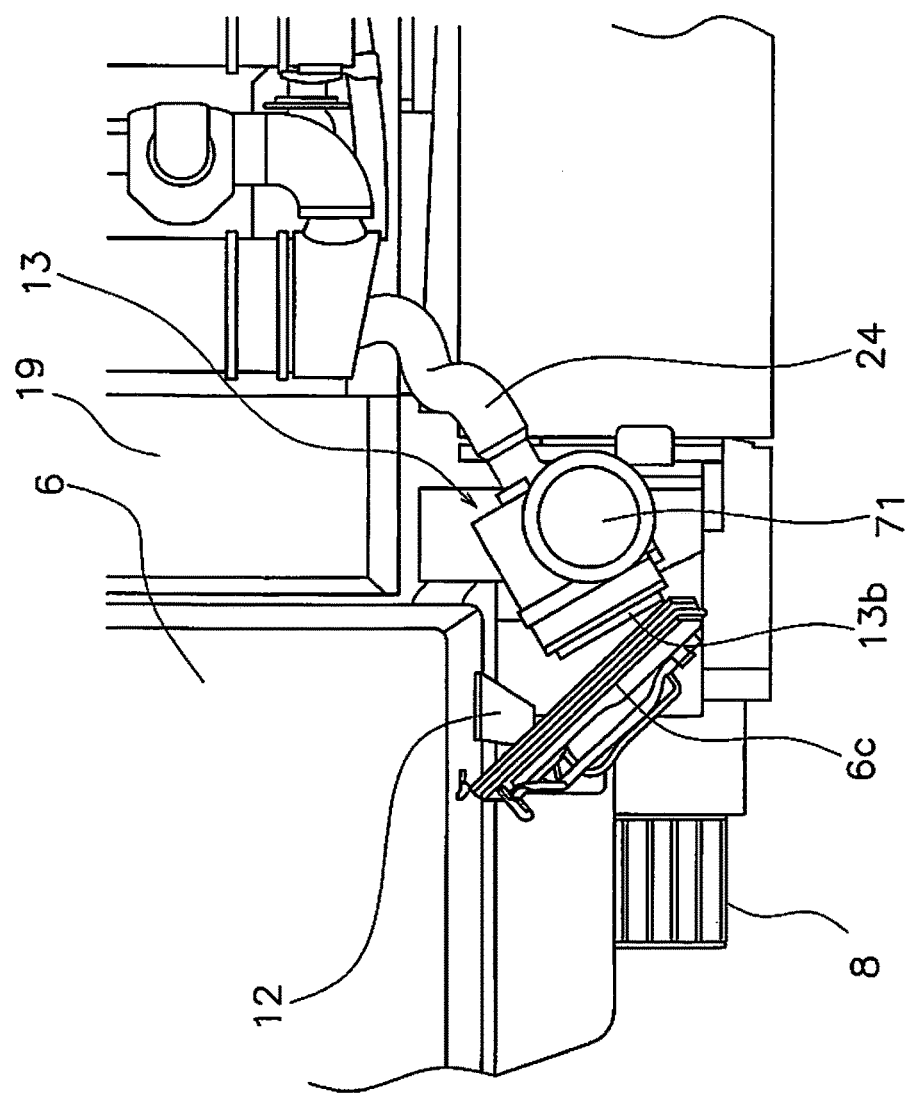
FIG. 9 illustrates a relationship between the air cleaner and a door.

As illustrated in FIGS. 2, 8, and 9, the air cleaner 13 is cylindrical and is provided with a cap 71 that covers an air intake mouth 13a on the upper part of the air cleaner 13, and with an openable and closable lid 13b on the front part of the air cleaner 13. A filter 72 is provided in an attachable and detachable manner inside the air cleaner 13. The air cleaner cover 70 covers most of the air cleaner 13 excluding the front edge part to which the air intake mouth 13a, the cap 71, and the lid 13b are attached. The filter 72 can be maintained and exchanged by opening the lid 13b and pulling the filter 72 out obliquely toward the front.

The disposition of the air cleaner 13 is explained in detail below.

As illustrated in FIG. 9, the air cleaner 13 is disposed on the upper part of the fender front part 5b of the rear wheel fender 5a to the rear of the cab 6. More specifically, the front part of the air cleaner 13 is located to the rear of the ladder 8 and to the left of the rear end part of the cab 6, and the rear part of the air cleaner 13 is located to the left of the front part of the operating fluid tank 19. A center axis C of the air cleaner 13 is substantially horizontal and is slanted with respect to the center axis extending to the front and rear of the vehicle so that the front part of the air cleaner 13 is further away from the cab 6 than the rear part as illustrated in FIG. 8. As described above, the filter 72 can be removed toward the front along the center axis C.

As described above, the stopper 6d for limiting the maximum opening degree of the door 6c is provided on the cab 6, and the front part of the air cleaner 13 is positioned to not obstruct the door 6c even when the door 6c is opened to the greatest amount to abut the stopper 6d.

Figure 10:
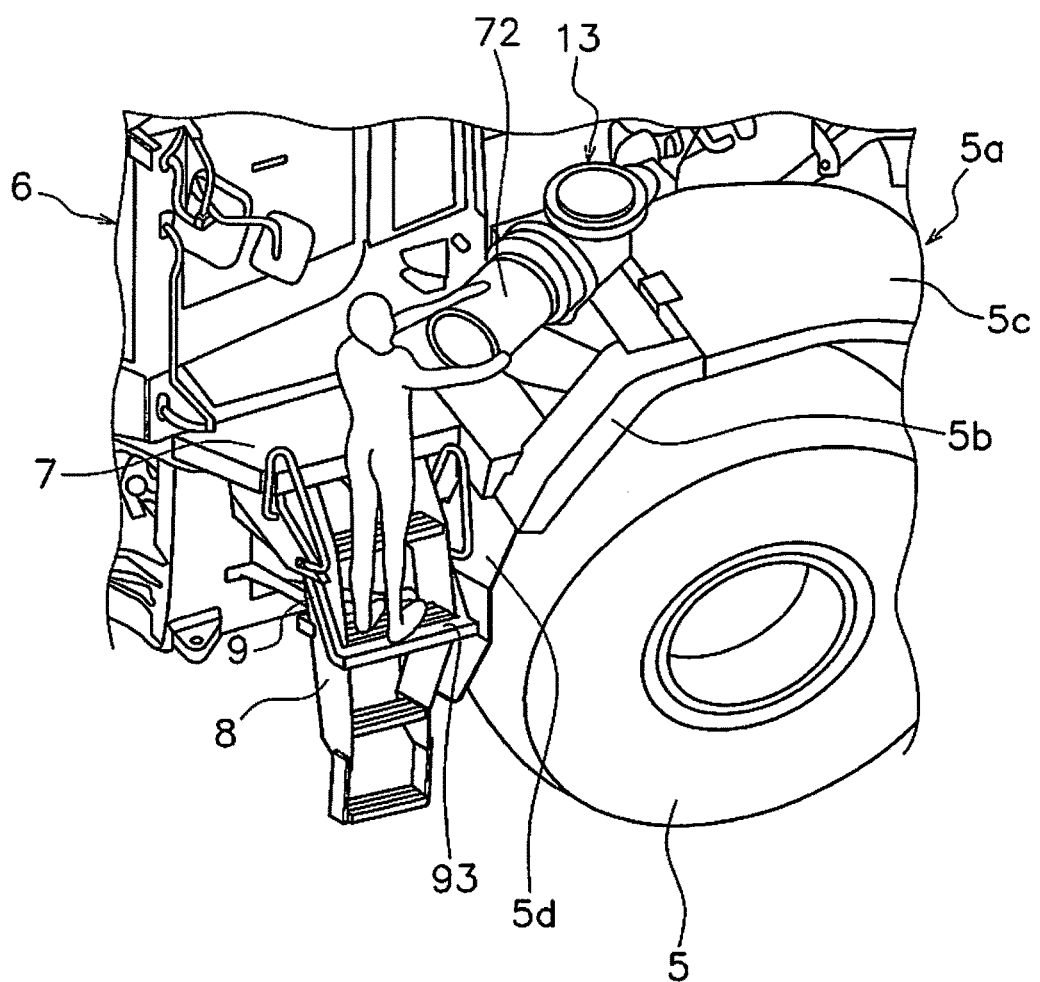
FIG. 10 illustrates an appearance of maintenance work on the air cleaner.

Due to the disposition of the air cleaner 13 as described above, the operator can stand on the flat part 93 and the second step 81b of the ladder 8 and open the lid 13b of the air cleaner 13 to easily perform maintenance work or exchange work of the filter 72 as illustrated in FIG. 10.

Flow of Air and Exhaust Gas

As illustrated in FIG. 7, air is introduced from the air cleaner 13 and fed into the engine 15 through the intake pipe 24 and the turbo charger 22. Exhaust gas from the engine 15 is introduced through the connecting pipe 23 into the exhaust gas post-treatment device 18 after driving the turbo charger 22.

Particulate matter, such as smoke, is collected by the diesel particulate filter device 45 in the exhaust gas post-treatment device 18. Next, the exhaust gas is then introduced into the urea aqueous solution injection device 46. Urea aqueous solution is emitted into the exhaust gas in the urea aqueous solution injection device 46. The emitted urea aqueous solution mixes with the exhaust gas inside the connecting pipe 48. Consequently, the urea aqueous solution is hydrolyzed by the heat of the exhaust gas and water vapor in the exhaust gas to become ammonia. The ammonia generated in this way is fed with the exhaust gas through the connecting pipe 48 to the nitrogen oxide reduction catalyst device 47. The ammonia is used as the reducing agent to purify by reduction the nitrogen oxides in the exhaust gas in the nitrogen oxide reduction catalyst device 47.

In the state in which the exhaust gas post-treatment device 18 is assembled, the engine 15 and the transmission 20 are mounted on the vehicle body frame 2 via rubber mounts 21, and the exhaust gas post-treatment device 18 is mounted directly onto the vehicle body frame 2 via the supporting mechanism 17. As a result, a difference arises between the vibrations from the engine 15 and the vibrations from the exhaust gas post-treatment device 18 while the vehicle is being driven.

However, the difference between the two vibrations can be sufficiently absorbed because the relatively long flexible pipe sections 54c, 54d are formed in the extending section 54a of the connecting pipe 23. Therefore, the vibration of the engine 15 can be suppressed.

Air Cleaner 13 Maintenance Work

Exchange work and cleaning of the filter 72 are required at certain time periods in the air cleaner 13. At this time the filter 72 is necessarily removed from the air cleaner 13.

When removing the filter 72 from the air cleaner 13, the operator first swings the body section 94 of the expansion member 9 to make the expansion member 9 assume the expanded posture as illustrated in FIG. 10. The operator then stands on the second step 81b of the ladder 8 and the flat part 93 of the expansion member 9 and opens the lid 13b of the air cleaner 13. The filter 72 of the air cleaner 13 may be pulled out toward the front along the center axis C of the air cleaner 13. At this time, because the air cleaner 13 is inclined so that the front side thereof is further away from the cab 6 than the rear side thereof, the work to remove the filter 72 is easy to perform. When the maintenance work is completed, the operator swings the body section 94 of the expansion member 9 so that the expansion member 9 assumes the retracted posture as illustrated in FIGS. 5 and 6.

Because the air cleaner 13 is disposed outside of the vehicle body cover 10 and above and to the rear of the ladder 8, the top plate of the engine room does not become higher and the diesel particulate filter device 45 and the nitrogen oxide reduction catalyst device 47 can be disposed above the engine 15. Therefore, a reduction in visibility to the rear can be avoided even when the nitrogen oxide reduction catalyst device 47 is added to the exhaust gas post-treatment device 18.

Because the air cleaner 13 is disposed above and to the rear of the ladder 8, maintenance work on the air cleaner 13 can be performed by the operator while standing on the ladder and the maintenance work can be performed easily. When the expansion member 9 assumes the expanded posture, the flat part 93 of the expansion member 9 abuts the second step 81b at the left side of the second step 81b. As a result, the operator is able to work while standing on the second step 81b and the flat part 93 and consequently is able to perform the maintenance work on the air cleaner 13 in a stable posture. When the operator is not performing maintenance work, that is, when the ladder 8 is used for climbing up to and down from the cab 6, the expansion member 9 assumes the retracted posture whereby the expansion member 9 does not become an obstruction while climbing up to and down from the cab 6.

The second step 81b is longer in the vehicle front-back direction than the third step 81c. According to this configuration, the operator is able to perform the maintenance work on the air cleaner 13 while maintaining a stable posture on the second step 81b.

The air cleaner 13 is configured to allow the filter 72 to be pulled out toward the ladder 8, and the air cleaner 13 is inclined so that a side from which the filter 72 is pulled out is further away from the cab 6 than the opposite side. Therefore, the operator can easily pull out the filter 72 while standing on the second step 81b of the ladder 8 and maintenance work can be conducted more easily.

The expansion member 9 is attached to the platform 7 and not to the ladder 8 and thus the expansion member 9 functions effectively even when the ladder 8 is deformed due to a collision and the like.

The upper part 121 to which the first and second steps 81a and 81b are fixed is positioned further to the rear than the lower part 123 to which the third step 81c is fixed. That is, the second step 81b extends further to the rear than the third step 81c and the operator is able to perform the maintenance work in a position closer to the air cleaner 13.

The vertical part 831 of the second handrail member 83b extends vertically on the left side of the rear strut 82b. Thus, the operator is able to perform the maintenance work of the air cleaner 13 while applying his weight onto the vertical part 831, and consequently is able to perform the maintenance work of the air cleaner 13 while maintaining a more stable posture.

The present invention is not limited to the above exemplary embodiments and various changes and modifications may be made without departing from the spirit of the invention.

While the ladder 8 has the three steps including the first to third steps 81a to 81c in the above exemplary embodiment, the ladder 8 is not limited in particular and may have four or more steps, or two steps or less.

While the air cleaner 13 is fixed to the rear wheel fender 5a in the previous exemplary embodiment, the air cleaner 13 may be fixed to another member so long as the air cleaner 13 is positioned above and to the rear of the ladder.

While a case in which the rear wheel fender 5a is divided into two parts and the air cleaner 13 is fixed to the fender front part 5b is described in the previous exemplary embodiment, the air cleaner 13 may be fixed to the upper part of an integrated rear wheel fender.

While a case in which the ladder 8 and the air cleaner 13 are provided on the left side of the cab 6 is described in the previous exemplary embodiment, the ladder 8 and the air cleaner 13 may be provided on the right side of the cab 6.

While the expansion member 9 is attached to the platform 7 in the above exemplary embodiment, the attachment component is not limited in particular, and the expansion member 9 may be attached to the ladder 8, for example. Specifically as illustrated in FIG. 17, the expansion member 9 has the flat part 93, the front arm part 92a, and the rear arm part 92b, and the distal end part of the front arm part 92a may be attached to the front strut 82a of the ladder 8 in a swingable manner, and the distal end part of the rear arm part 92b may be attached to the rear strut 82b of the ladder 8. In this case, the fixed part of the expansion member 9 may be omitted.

While the expansion member 9 is configured to expand the length of the second step 81b in the vehicle width direction, the expansion member 9 is not limited to this configuration. For example, the expansion member 9 may be configured to expand the length of the first step 81a in the vehicle width direction. In this case, when the expansion member 9 assumes the expanded posture, the flat part 93 is positioned to the left side of the first step 81a so as to abut the first step 81a. In this case, the first step 81a corresponds to the at least one step in the present invention. The expansion member 9 may be provided as two expansion members 9 and configured to expand the lengths of both the first step 81a and the second step 81b in the vehicle width direction. In this case, the first step 81a and the second step 81b correspond to the at least one step in the present invention. That is, more than one of the at least one step may be provided.

While the expansion member 9 is able to assume the expanded posture and the retracted posture in the above exemplary embodiment, the expansion member 9 is not limited in this way. For example, the expansion member 9 may be configured to assume only the expanded posture. In this case, the expansion member 9 may be attached, for example, to the platform 7 or the ladder 8 in a detachable manner. The expansion member 9 then assumes the expanded posture while the expansion member 9 is attached.

What is claimed is:

1. A wheel loader comprising:
   a cab provided with a driver seat therein;
   a ladder having a plurality of steps disposed with intervals therebetween, a lengthwise direction of each of the steps extending in a vehicle front-back direction of the wheel loader the ladder being provided at a side of the cab in a vehicle width direction of the wheel loader;
   an expansion member having a body section, the body section including an elongated flat part, the body section being movably provided between a retracted posture and an expanded posture, the body section being configured such that the flat part abuts against at least one of the steps in an inward vehicle width direction when the body section is in the expanded posture, a lengthwise direction of the flat part extending parallel to the lengthwise direction of the at least one of the steps in the expanded posture, and the flat part protruding outward from the at least one of the steps in the vehicle width direction in the expanded posture;

a vehicle body cover disposed to the rear of the cab and demarcating an engine room;

an engine disposed inside the engine room; and an air cleaner having therein an exchangeable filter, the air cleaner being disposed outside of the vehicle body cover, the air cleaner cleaning air being supplied to the engine, when the expansion member assumes the expanded posture, the air cleaner is disposed above and to the rear of the expansion member.

2. The wheel loader according to claim 1, wherein the expansion member is retracted from the at least one of the steps in a retracted posture.

3. The wheel loader according to claim 2, further comprising a platform disposed at the side of the cab, the expansion member being positioned under the platform in the retracted posture.

4. The wheel loader according to claim 3, wherein the expansion member is attached to the platform.

5. The wheel loader according to claim 2, wherein the at least one of the steps has a length in the vehicle front-back direction greater than that of the other steps.

6. The wheel loader according to claim 5, wherein the air cleaner is configured so that the filter can be pulled out toward the ladder and disposed to be inclined so that a pulling-out side of the filter is further away from the cab than an opposite side.

7. The wheel loader according to claim 1, wherein the at least one of the steps has a length in the vehicle front-back direction greater than that of the other steps.

8. The wheel loader according to claim 1, wherein the air cleaner is configured so that the filter can be pulled out toward the ladder, and the air cleaner is arranged in a diagonal orientation with respect to a vehicle front-back direction of the wheel loader so that a front part of the air cleaner is further away from the cab in the vehicle width direction than rear part of the air cleaner.

9. The wheel loader according to claim 1, wherein the ladder extends downward from a platform disposed at the side of the cab;

a first step positioned at the top of the plurality of steps protrudes from the platform in the vehicle width direction;

steps other than the first step protrude in the vehicle width direction with respect to one step thereabove; and a protrusion amount of the plurality of steps is fixed.

10. The wheel loader according to claim 1, wherein the ladder has a front strut and a rear strut that extend in the vertical direction and that are disposed away from each other in the vehicle front-back direction;

the plurality of steps extend to cross between the front strut and the rear strut; and the rear strut has an upper part to which a first step positioned at the top and a second step positioned second from the top among the plurality of steps are attached, and a lower part to which another step is attached, the lower part being positioned further toward the front of the vehicle than the upper part.

11. The wheel loader according to claim 10, wherein the rear strut further has a middle part that couples the upper part and the lower part; and the middle part is inclined rearward in an upward direction as seen in a side view of the vehicle.

12. The wheel loader according to claim 10, further comprising a handrail member provided along the rear strut;

the handrail member having a vertical part that extends vertically; and the vertical part being positioned to the outside in the vehicle width direction of the rear strut.

13. The wheel loader according to claim 12, wherein an upper edge of the handrail member is positioned below the platform installed at the side of the cab.

14. The wheel loader according to claim 1, wherein the ladder further has a supplementary step below the step positioned at the bottom and that hangs down with elastic strips.

15. The wheel loader according to claim 1, wherein the flat part is disposed farther inward in the vehicle width direction when the expansion member assumes the retracted posture than when the expansion member assumes the expanded posture.

16. A wheel loader comprising:

a cab provided with a driver seat therein;

a platform disposed at the side of the cab;

a ladder provided at a side of the cab, the ladder having a plurality of steps disposed with intervals therebetween;

an expansion member that attached to the platform and configured to expand and retract between an expanded posture and a retracted posture, the expansion member abutting at least one of the steps and protruding in the vehicle width direction in the expanded posture, the expansion member being retracted from the at least one of the steps and positioned under the platform in the retracted posture;

a vehicle body cover disposed to the rear of the cab and demarcating an engine room;

an engine disposed inside the engine room; and an air cleaner having therein an exchangeable filter, the air cleaner being disposed outside of the vehicle body cover, the air cleaner cleaning air being supplied to the engine, the air cleaner being arranged to be disposed above and to the rear of the expansion member when the expansion member assumes the expanded posture, the expansion member including
    a fixed part extending downward from the platform;
    an arm part coupled to a lower end part of the fixed part in a swingable manner; and
    a flat part extending from the arm part in the vehicle front-back direction and abutting the at least one of the steps in the expanded posture.

17. The wheel loader according to claim 16, wherein the ladder extends downward from a platform disposed at the side of the cab;

a first step positioned at the top of the plurality of steps protrudes from the platform in the vehicle width direction;

steps other than the first step protrude in the vehicle width direction with respect to one step thereabove; and a protrusion amount of the plurality of steps is fixed.

18. The wheel loader according to claim 17, wherein the ladder has a front strut and a rear strut that extend in the vertical direction and that are disposed away from each other in the vehicle front-back direction;

the plurality of steps extend to cross between the front strut and the rear strut; and the rear strut has an upper part to which a first step positioned at the top and a second step positioned second from the top among the plurality of steps are attached, and a lower part to which another step is attached, the lower part being positioned further toward the front of the vehicle than the upper part.

19. The wheel loader according to claim 18, wherein
the rear strut further has a middle part that couples the upper part and the lower part; and
the middle part is inclined rearward in an upward direction as seen in a side view of the vehicle.

20. The wheel loader according to claim 19, further comprising
a handrail member provided along the rear strut,
the handrail member having a vertical part that extends vertically, the vertical part being positioned to the outside in the vehicle width direction of the rear strut, and an upper edge of the handrail member being positioned below the platform installed at the side of the cab.

21. The wheel loader according to claim 20, wherein
the ladder further has a supplementary step below the step positioned at the bottom and that hangs down with elastic strips.

* * * * *